(12) United States Patent
Ilie

(10) Patent No.: US 11,655,849 B2
(45) Date of Patent: May 23, 2023

(54) UNITIZED LINER HANGAR BEARING

(71) Applicant: Schaeffler Technologies AG & Co. KG, Herzogenaurach (DE)

(72) Inventor: Dorin Ilie, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 36 days.

(21) Appl. No.: 17/323,010

(22) Filed: May 18, 2021

(65) Prior Publication Data

US 2021/0364038 A1  Nov. 25, 2021

Related U.S. Application Data

(60) Provisional application No. 63/029,942, filed on May 26, 2020, provisional application No. 63/028,689, filed on May 22, 2020.

(51) Int. Cl.
*F16C 19/30* (2006.01)
*F16C 33/58* (2006.01)

(52) U.S. Cl.
CPC ............ *F16C 19/30* (2013.01); *F16C 33/586* (2013.01)

(58) Field of Classification Search
CPC ...... F16C 19/30; F16C 19/305; F16C 33/581; F16C 41/045; F16C 43/04; F16C 2240/84
See application file for complete search history.

(56) References Cited

U.S. PATENT DOCUMENTS

| 1,649,285 | A | * | 11/1927 | Buckwalter | F16C 33/366 |
| | | | | | 384/618 |
| 4,932,796 | A | * | 6/1990 | Schurger | F16C 33/7886 |
| | | | | | 384/607 |
| 7,841,774 | B2 | * | 11/2010 | Thompson | F16C 19/30 |
| | | | | | 384/903 |
| 8,807,842 | B2 | * | 8/2014 | Salunke | F16C 33/761 |
| | | | | | 384/477 |
| 2008/0267547 | A1 | | 10/2008 | Thompson | |
| 2013/0266248 | A1 | | 10/2013 | Wolf | |
| 2015/0285307 | A1 | | 10/2015 | Mola et al. | |

FOREIGN PATENT DOCUMENTS

| CN | 106438682 | * | 2/2017 |
| DE | 9211702 | * | 2/1993 |
| FR | 7305877 | * | 10/1973 |
| JP | 2017026030 A | | 2/2017 |
| KR | 102075472 B1 | | 2/2020 |

OTHER PUBLICATIONS

Translation of DE 9211702 obtained Jun. 2022.*
Tackpoint, Producer of full complement cylindrical roller bearings for liner hanger bearings, https://www.tackpoint.com/thrust-bearings, retrieved from the internet on May 17, 2021, Canada.
Tackpoint, Producer of full complement cylindrical roller bearings for liner hanger bearings, https://www.tackpoint.com/full-complement-bearing-gallery/5jty87co1v4kjtp1vmrx5v7ed60y0f, retrieved from the internet on May 17, 2021, Canada.

* cited by examiner

*Primary Examiner* — James Pilkington

(57) ABSTRACT

An axial bearing is designed to work in a liner hangar in which radial package space is at a premium. Rollers axially separate two washers. To hold the bearing together prior to installation, a sleeve radially surrounds the rollers and has tabs which fit into circumferential grooves in the washers. The sleeve may be metal or plastic.

10 Claims, 4 Drawing Sheets

UNITIZED LINER HANGAR BEARING

CROSS-REFERENCE TO RELATED APPLICATIONS

This application claims priority to U.S. Provisional Application 63/028,689 filed May 22, 2020 and to U.S. Provisional Application 63/029,942 filed May 26, 2020, the entire disclosures of which are incorporated by reference herein.

TECHNICAL FIELD

This disclosure pertains to the general field of axial roller bearings. More particularly, it pertains to a unitized, full-complement axial bearings.

BACKGROUND

Deep wells may be drilled using a series of well liners in a telescoping arrangement, wherein the liners for the deepest parts of the well are of smaller diameter than the liners for the shallower portions of the well. The joint between sections of wells are called liner hangars. During the drilling process, the new section of liner being placed is rotated while the existing shallower sections are fixed. Large axial forces are transmitted between these sections during the drilling process. The radial space available for bearings is very limited because the sections of liner for the yet deeper portions of the well must pass through.

Some bearings have cages which position rollers circumferentially with respect to each other. Other bearings, called full-complement bearings, pack the rollers tightly in the available circumferential space and omit the cage. Full-complement bearings have a larger load capacity than caged bearings due to the greater number of rollers, but may have higher parasitic drag.

Some bearing designs rely on non-bearing components to hold the bearing components in place with respect to one another. Bearing components include the rollers themselves and the parts against which they are designed to roll, which are called washers for axial bearings and called rings for radial bearings. When the bearing components are designed to stay together before being positioned into the assembly, the bearing is called a unitized bearing. Unitized bearings simply the assembly process.

SUMMARY

A unitized axial bearing includes two washers, a plurality of rollers, and a sleeve. The rollers axially separate the washers. The washers have circumferential groves on a radially outer surface. The sleeve radially surrounds the washers and the rollers to radially retain the rollers. The sleeve has a plurality of inwardly directed tabs extending into the grooves of the washers to axially retain the washers. The sleeve may define a plurality of axial cuts between respective tabs. The rollers may be cylinders. In one embodiment, the sleeve is made of sheet metal. The inwardly directed tabs may be formed by a punching operation. The circumferential groove may be V-shaped in cross section. In another embodiment, the sleeve is made of plastic.

A method of fabricating a unitized axial bearing include fabrication of a sleeve from steel sheet and assembling the sleeve and remaining bearing components. The steel sheet is punched to form tabs. Axial cuts may also be punched into the steel sheet. Then, the steel sheet is rolled into a cylinder and welded to form a sleeve. The sleeve may be heat treated. Two washers are forced axially into opposite ends of the sleeve, the tabs springing into circumferential grooves in the washers to axially retain the washers with respect to the sleeve. Rollers are installed between the washers. The assembled bearing may be placed on a false shaft for shipping.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
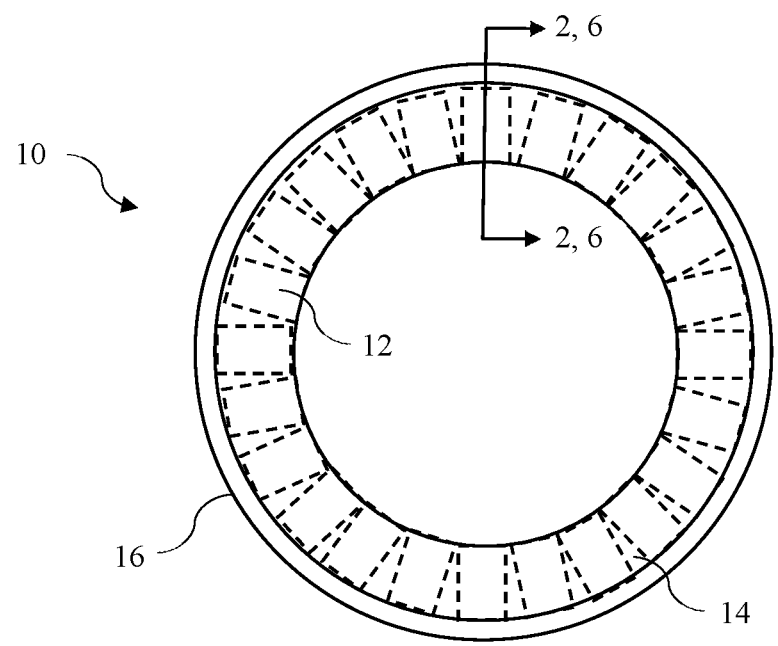
FIG. 1 is an end view of a unitized full complement axial bearing.
Figure 2:
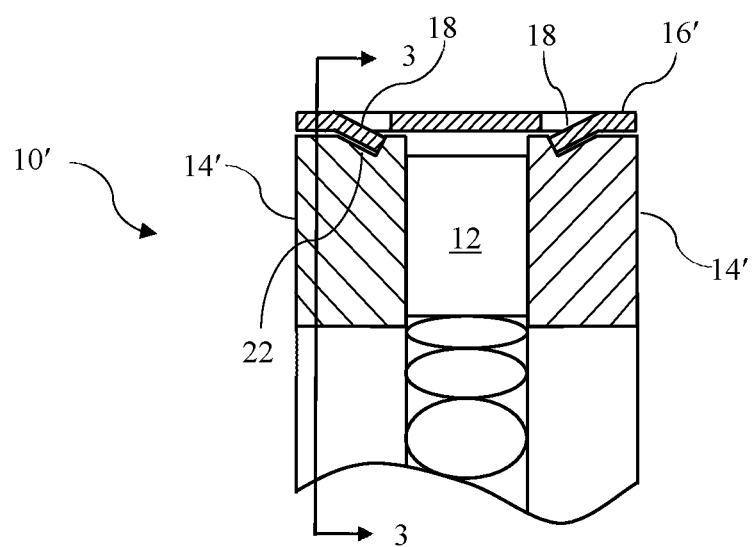
FIG. 2 is cross section of a first embodiment of the bearing of FIG. 1.

FIG. 1 is an end-view of a unitized axial bearing 10. A set of rollers 12 are sandwiched between two washers 14. A sleeve 16 radially surrounds the assembly. FIG. 2 is a cross section through a first embodiment of the bearing 10'. In this embodiment, the sleeve 16' is a sheet metal sleeve. Stamped tabs 18 in the sheet metal sleeve 16' are bent inward and fit in grooves 22 in the washers. The tabs 18 flex as the respective washer is inserted into position from a respective end, and then snap back into position. The tabs 18 retain the washers 14' in position axially. The washers, in turn, retain the rollers axially. The sleeve 16' retains the washers and the rollers radially.

Figure 3:
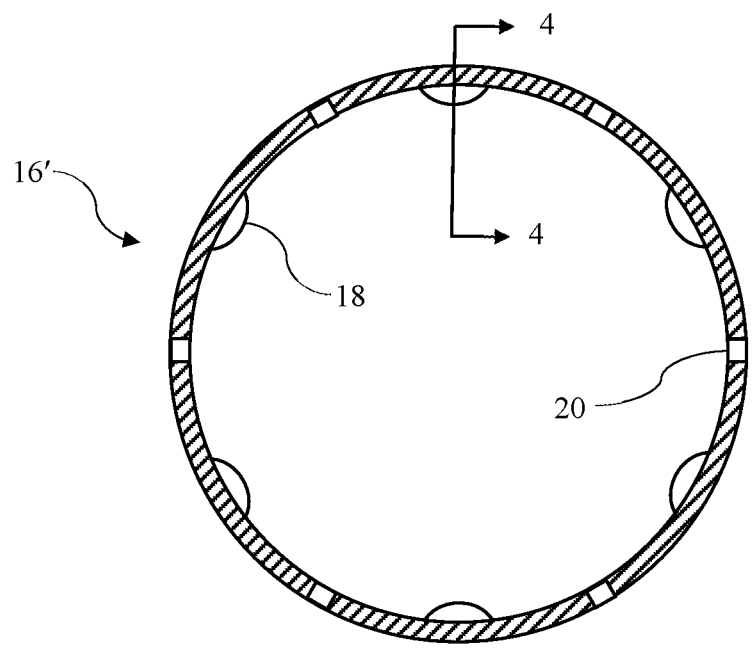
FIG. 3 is a first cross section of the sheet metal sleeve of the bearing of FIG. 2.
Figure 4:
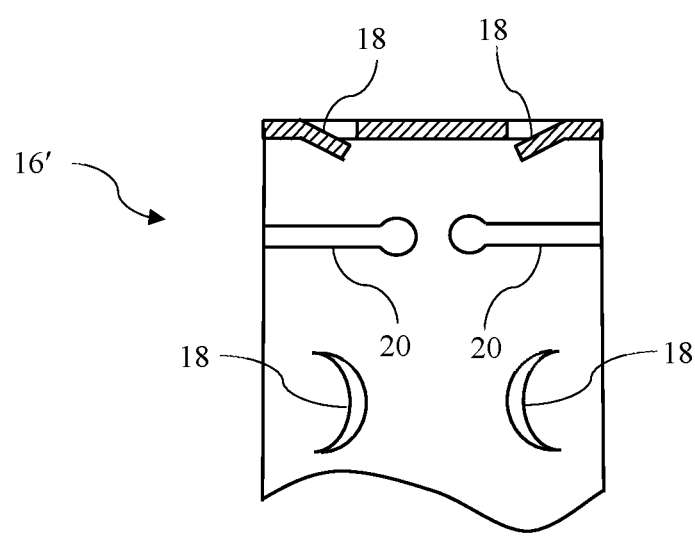
FIG. 4 is a second cross section of the sheet metal sleeve of the bearing of FIG. 2.

FIG. 3 is a cross section through the sheet metal sleeve 16'. Six tabs 18 are spaced equally around the circumference to retain one of the washers. Another six tabs retain the other washer. Axial cuts 20 are made midway between the tabs to increase elasticity and reduce the force necessary to insert the washers. FIG. 4 is another cross-sectional view of the sheet metal sleeve 16', showing the tabs and axial cuts more clearly.

Figure 5:
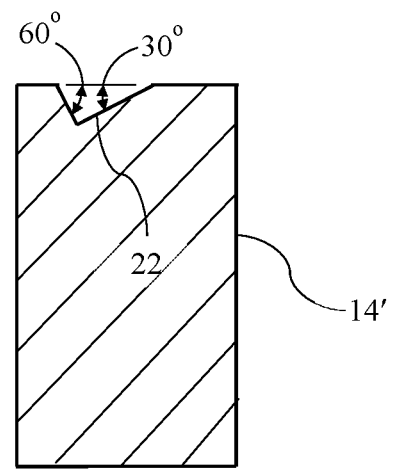
FIG. 5 is a cross section view of one of the washers of the bearing of FIG. 2.

FIG. 5 is a cross section of one of the washers 14' showing the groove 22 in more detail.

The sheet metal sleeve may be fabricated from a strip of steel sheet. The tabs and axial cuts may be formed in the steel sheet with a punching operation. After punching, the steel sheet may be rolled into a cylinder and welded. A heat treatment, such as quenching, may be used to ensure proper elasticity.

A batch of assembled bearings may be placed on a false shaft for shipping. The false shaft prevents rollers from coming out toward the inner diameter. The bearings in the batch may be separated axially by plates with a hole for the false shaft. Installation of the bearing is accomplished by placing the false shaft end-to-end with the application shaft and pushing an assembled bearing from the false shaft onto the application shaft using the plate.

Figure 6:
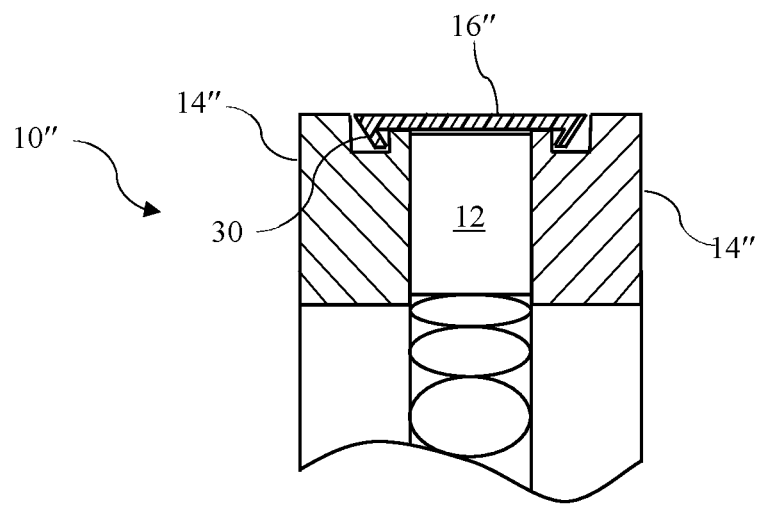
FIG. 6 is cross section of a second embodiment of the bearing of FIG. 1.

FIG. 6 is a cross section through a second embodiment of the bearing 10''. In this embodiment, a plastic sleeve 16'' radially surrounds the assembly. Molded tabs 30 in the plastic sleeve extend inward and fit in grooves in the washers 14''. The tabs 30 flex as the respective washer is inserted into position from a respective end, and then snap back into position. The tabs retain the washers in position axially. The washers, in turn, retain the rollers axially. The sleeve retains the washers and the rollers radially.

Figure 7:
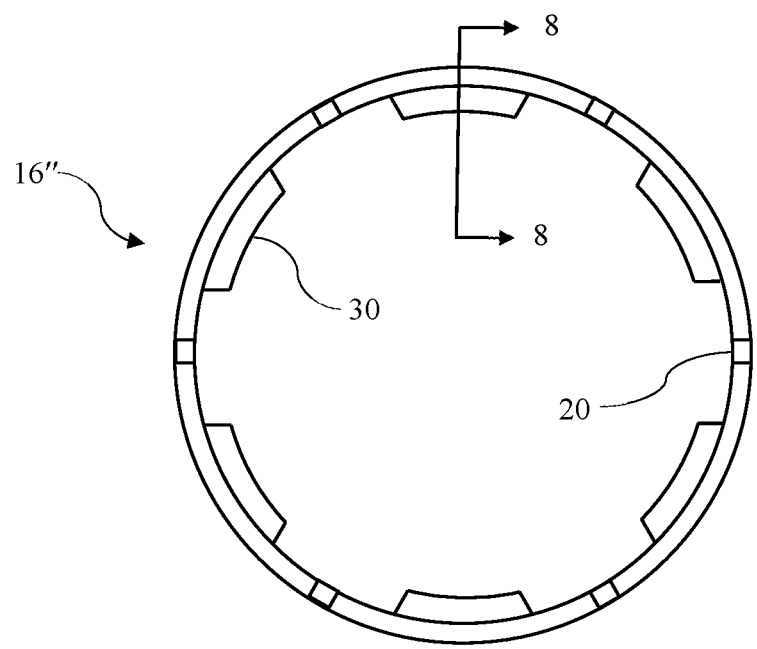
FIG. 7 is a first cross section of the plastic sleeve of the bearing of FIG. 6.
Figure 8:
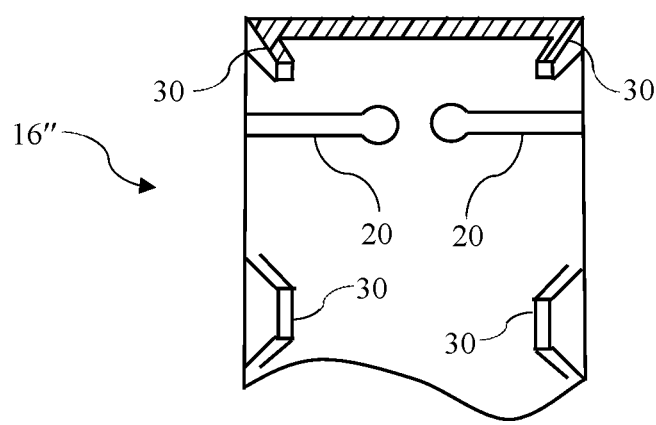
FIG. 8 is a second cross section of the plastic sleeve of the bearing of FIG. 6.

FIG. 7 is an end view of the plastic sleeve 16. Six tabs 30 are spaced equally around the circumference to retain one of the washers. Another six tabs retain the other washer. Axial cuts 20 are made midway between the tabs to increase elasticity and reduce the force necessary to insert the washers. FIG. 8 is a cross-sectional view of the plastic sleeve 16'', showing the tabs and axial cuts more clearly. In the illustrated embodiment, the tabs on one end of the plastic sleeve are circumferentially aligned with the tabs on the opposite end. Similarly, the grooves on one end are circumferentially aligned with the grooves on the opposite end. In other embodiments, they may be staggered.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A unitized axial bearing comprising:
   a plurality of rollers axially separating two washers, each washer having a circumferential groove on a radially outer surface; and
   a sleeve radially surrounding the washers and the rollers to radially retain the rollers, the sleeve having a plurality of inwardly directed tabs extending into the grooves of the washers to axially retain the washers;
   wherein the sleeves defines at least one axial cut between respective tabs.

2. The unitized axial bearing of claim 1 wherein the rollers are cylinders.

3. The unitized axial bearing of claim 1 wherein the sleeve is made of sheet metal.

4. The unitized axial bearing of claim 3 wherein the inwardly directed tabs are formed by a punching operation.

5. The unitized axial bearing of claim 3 wherein the circumferential groove is V-shaped in cross section.

6. The unitized axial bearing of claim 1 wherein the sleeve is made of plastic.

7. A method of fabricating a unitized axial bearing comprising:
   punching a steel sheet to form tabs;
   rolling the steel sheet into a cylinder and welding it to form a sleeve;
   providing two washers, each washer having a circumferential groove;
   forcing the washers axially into opposite ends of the sleeve, the tabs springing into the grooves to axially retain the washers with respect to the sleeve; and
   installing rollers between the washers.

8. The method of claim 7 further comprising punching axial cuts into the sheet of steel.

9. The method of claim 7 further comprising heat treating the sleeve.

10. The method of claim 7 further comprising placing the bearing on a false shaft for shipping.

\* \* \* \* \*